(12) United States Patent
Heidari et al.

(10) Patent No.: US 8,432,826 B2
(45) Date of Patent: Apr. 30, 2013

(54) CHANNEL SCANNING AND CHANNEL SELECTION IN A WIRELESS COMMUNICATION NETWORK

(75) Inventors: Sam Heidari, Los Altos Hills, CA (US); Kapil Gulati, Cupertino, CA (US); Ali Rouhi, Oakland, CA (US); Ravi Narasimhan, Los Altos, CA (US); Rajkumar Samuel, San Jose, CA (US)

(73) Assignee: Quantenna Communications, Inc., Fremont, CA (US)

( * ) Notice: Subject to any disclaimer, the term of this patent is extended or adjusted under 35 U.S.C. 154(b) by 351 days.

(21) Appl. No.: 12/913,200

(22) Filed: Oct. 27, 2010

(65) Prior Publication Data

US 2011/0096739 A1 Apr. 28, 2011

Related U.S. Application Data

(60) Provisional application No. 61/255,363, filed on Oct. 27, 2009.

(51) Int. Cl.
| | | |
|---|---|---|
| *H04L 12/28* | (2006.01) | |
| *H04W 4/00* | (2009.01) | |
| *H04W 72/00* | (2009.01) | |
| *H04B 7/212* | (2006.01) | |

(52) U.S. Cl.
USPC ........... 370/252; 370/332; 370/334; 370/437; 455/450

(58) Field of Classification Search .................. 370/252, 370/310–350, 431–437, 462; 375/140–148, 375/260; 455/103–104, 450–454, 464, 509
See application file for complete search history.

(56) References Cited

U.S. PATENT DOCUMENTS

| | | | |
|---|---|---|---|
| 7,990,941 B2 * | 8/2011 | Levin et al. .................... 370/344 |
| 8,144,725 B2 * | 3/2012 | Bienas et al. .................. 370/449 |
| 2003/0228857 A1 | 12/2003 | Maeki | |
| 2004/0264394 A1 | 12/2004 | Ginzburg et al. | |
| 2005/0245258 A1 | 11/2005 | Classon et al. | |
| 2006/0242457 A1 | 10/2006 | Roy et al. | |
| 2008/0082498 A1 | 4/2008 | Dong et al. | |
| 2008/0137620 A1 * | 6/2008 | Wang et al. .................... 370/337 |
| 2008/0232240 A1 * | 9/2008 | Baum et al. .................... 370/210 |
| 2009/0154588 A1 * | 6/2009 | Chen et al. ..................... 375/267 |
| 2010/0316003 A1 * | 12/2010 | Sukiasyan et al. ............. 370/329 |

OTHER PUBLICATIONS

Search Report and Written Opinion mailed Jun. 29, 2011 from International Serial No. PCT/US2010/054328 filed Oct. 27, 2010.

* cited by examiner

*Primary Examiner* — Tri H Phan

(57) ABSTRACT

A method and apparatus to select the best channel of a wireless network for data communication at any given time, during normal operation of the network, is described. The network may be an IEEE standard 802.11 compliant network. Channel scanning may be performed in any station on the wireless network, such as an access point (AP) or a mobile station, or both. Channel scanning may be performed during data communication idle time, or simultaneously with data communication on the network. The technique can be implemented in a multiple-input multiple-output (MIMO) communication system, where the antenna or antennas used for channel scanning can be selected dynamically during operation, to optimize one or more performance characteristics.

24 Claims, 10 Drawing Sheets

| Channel | Quality Measure | Quality Rank |
|---------|-----------------|--------------|
| 1 | | |
| 2 | | |
| 3 | | |
| ⋮ | ⋮ | ⋮ |
| N | | |

Fig. 7

CHANNEL SCANNING AND CHANNEL SELECTION IN A WIRELESS COMMUNICATION NETWORK

This application claims the benefit of U.S. Provisional Patent application No. 61/255,363, filed on Oct. 27, 2009, which is incorporated herein by reference.

FIELD OF THE INVENTION

At least one embodiment of the present invention pertains to wireless communication networks, and more particularly, to a method and apparatus for scanning a set of channels in a wireless communication network to determine channel quality and select a channel on which to operate based on a result of the scanning.

BACKGROUND

Wireless communication networks that comply with one or more versions of Institute of Electrical and Electronics Engineers (IEEE) standard 802.11 (e.g., 802.11a, 802.11b, 802.11g, 802.11n) and/or which are WI-FI certified have gained widespread use in recent years. In 802.11n and WI-FI communication systems, the allocated (allowed) spectrum is usually divided into smaller channels, where at any given time each of the devices communicating with each other on a given network are only maintaining or confined to a single channel. For example the 2.4 GHz band is divided into 14 overlapping channels, each of width 20 MHz but spaced only 5 MHz apart. At the lowest end of the band channel 1 is centered on 2.412 GHz, and at the highest end channel 14 is centered on 2.484 GHz. Access to these channels is regulated by country or region, and not every channel is accessible in every country or region. For example, typically only three channels are accessible in the 2 GHz band in any given country or region. Similarly, IEEE 802.11n provides that the 5 GHz band can include 24 non-overlapping 20 MHz channels or up to 12 non-overlapping 40 MHz channels.

Performance of a wireless communication system can vary at any given time depending on the frequency (channel) being used and the signal environment. Factors that can affect the quality and/or speed of communication on a given channel include the number and strength of overlapping base service sets (BSS) on the channel, the level of interference on the channel, the presence of radar on the channel, etc. Therefore, many 802.11 and WI-FI communication systems include the ability to switch channels dynamically to obtain optimal performance.

However, the ability to identify the best channel at any given time, particularly during normal operation as opposed to at start-up, remains problematic. The present state-of-the-art is in need of improvement in this regard.

SUMMARY

This summary is provided to introduce in a simplified form certain concepts that are further described in the Detailed Description below. This summary is not intended to identify essential features of the claimed subject matter or to limit the scope of the claimed subject matter.

It is desirable in a wireless communication network (including but not limited to an IEEE 802.11 compliant network) to select for data communication the channel on which performance for the network will be best, at any given time, during normal operation of the network (not only at start-up). The technique introduced here provides such ability.

The technique in one embodiment includes scanning a channel of a wireless communication network to determine a measure of quality of the channel during an operational mode of the wireless network after completing a start-up mode. Results of the channel scanning may be used to identify the best channel to use of a set of channels, and to switch to the best channel if the best channel is not the current channel.

The channel scanning may be performed in an access point (AP) on the network, in a client station on the network, or in any other station on the network. In certain embodiments, operations that implement the technique are distributed among two or more stations on a network.

The channel scanning may be performed during data communication idle time on the wireless communication network. In that case, for example, the channel scanning can include switching from a first channel to a second channel without terminating a communication link after communicating data on the first channel via the communication link, then scanning the second channel, and then switching back to the first channel before the communication link is terminated.

Alternatively, the channel scanning may be performed simultaneously with data communication on the network, such as when the technique is implemented in a dual concurrent mode system.

The channel scanning can be performed by a station on a wireless communication network in response to a command it receives from another station on the network. In that case, the station that does the scanning may send a result of the channel scanning to another station on the network, which may be the station which sent the command. For example, an AP may command one or more client stations on the wireless network to each scan at least one channel and return the results back to the AP. The AP may then use these results to select the best channel for data communication. The AP may further advertise the results of scanning multiple channels, including a ranking of channels, to other devices on the network.

The technique introduced here can be implemented in a multiple-input multiple-output (MIMO) communication system. For example, the system may be an M×N MIMO system, where M is the number of transmit antennas and N is the number of receive antennas, where the system uses M1×N1 antennas for channel scanning and M2×N2 antennas for data communication, where M=M1+M2 and N=N1+N2. The number of antennas used for channel scanning and which particular antennas are used for channel scanning can be selected dynamically during operation of the system, to optimize one or more specific performance characteristics.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements.

FIG. 7 illustrates an example of a lookup table that associates a quality measure and rank with each channel.

DETAILED DESCRIPTION

Figure 1:
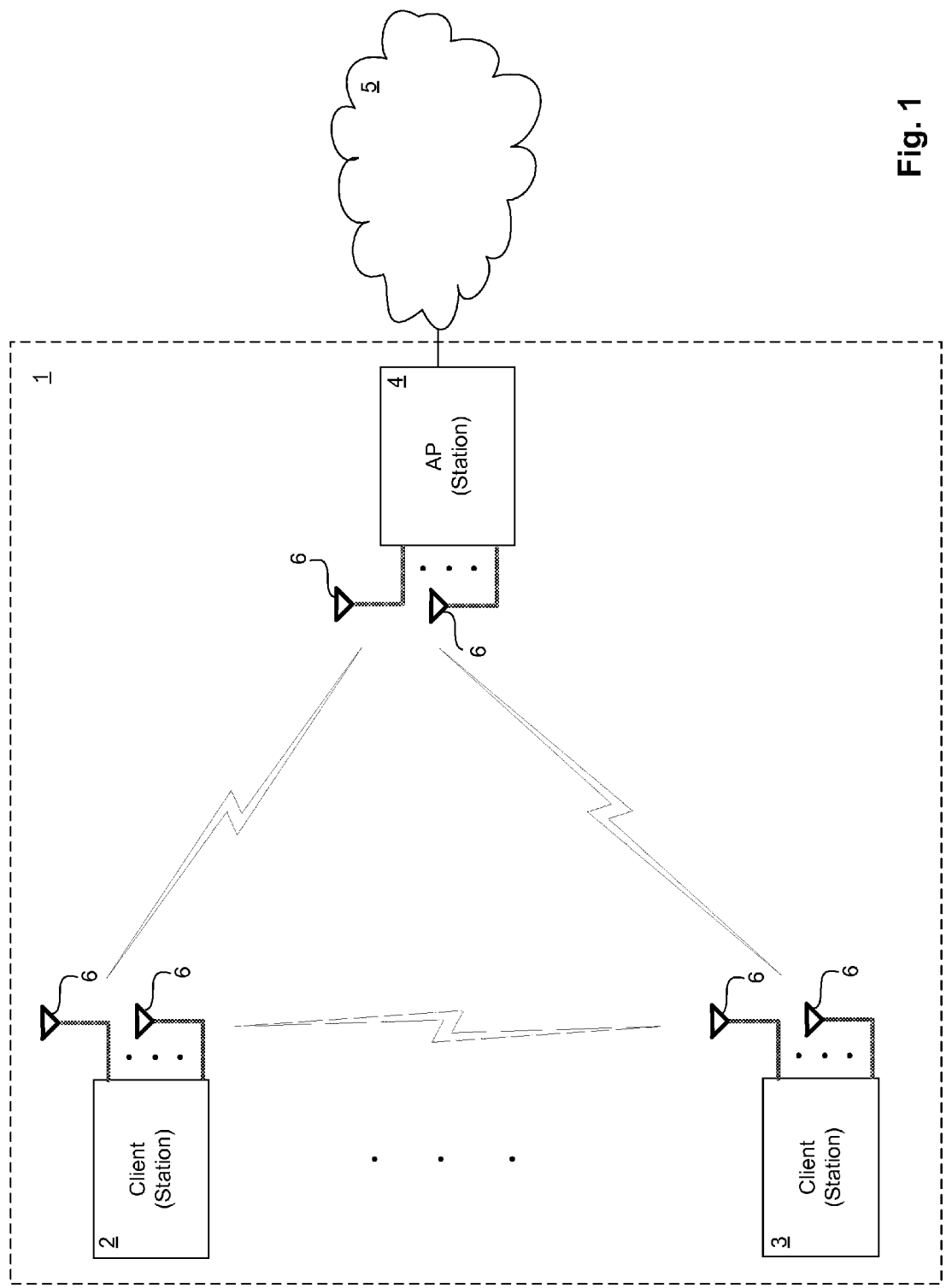
FIG. 1 illustrates an environment in which the channel scanning technique introduced here can be implemented.

The channel scanning and selection technique introduced here can be implemented in any station, or in multiple stations, on a wireless communications network, i.e., in one or more access points (APs) and/or one or more client stations. FIG. 1 illustrates an environment in which the technique introduced here can be implemented. As shown, a wireless communication network 1 includes a number of stations, which include one or more client stations 2, 3 and one or more APs 4 (for simplicity, only one AP is shown). For purposes of this description, it is assumed that the devices on the wireless communication network 1 implement some version of IEEE standard 802.11. It should be understood, however, that the technique introduced here can also be applied to other types of wireless communication networks.

An AP is defined herein as a station that enables access by associated stations to distribution services via a wireless medium. The term "distribution services" is used herein as defined in the IEEE standard 802.11. In some embodiments the AP 4 may be connected to at least one other network 5 as shown (e.g., the Internet or another wireless communication network), and may function to provide the client stations 2, 3 on the wireless network 1 with access to such other network.

A client station 2, 3 or an AP 4 in this context can be a mobile station. A mobile station is a station which has the ability to communicate on the wireless network while in motion. Hence, an AP 4 may have a wired or wireless connection to the other network 5. In certain embodiments, an AP may be a mobile station, and likewise, one or more mobile stations may be are operable as APs. As shown, in one embodiment the wireless network 1 includes a MIMO system (i.e., the client stations 2, 3 and AP 4 are MIMO devices), in accordance with which each of the stations includes multiple antennas 6.

Figure 2:
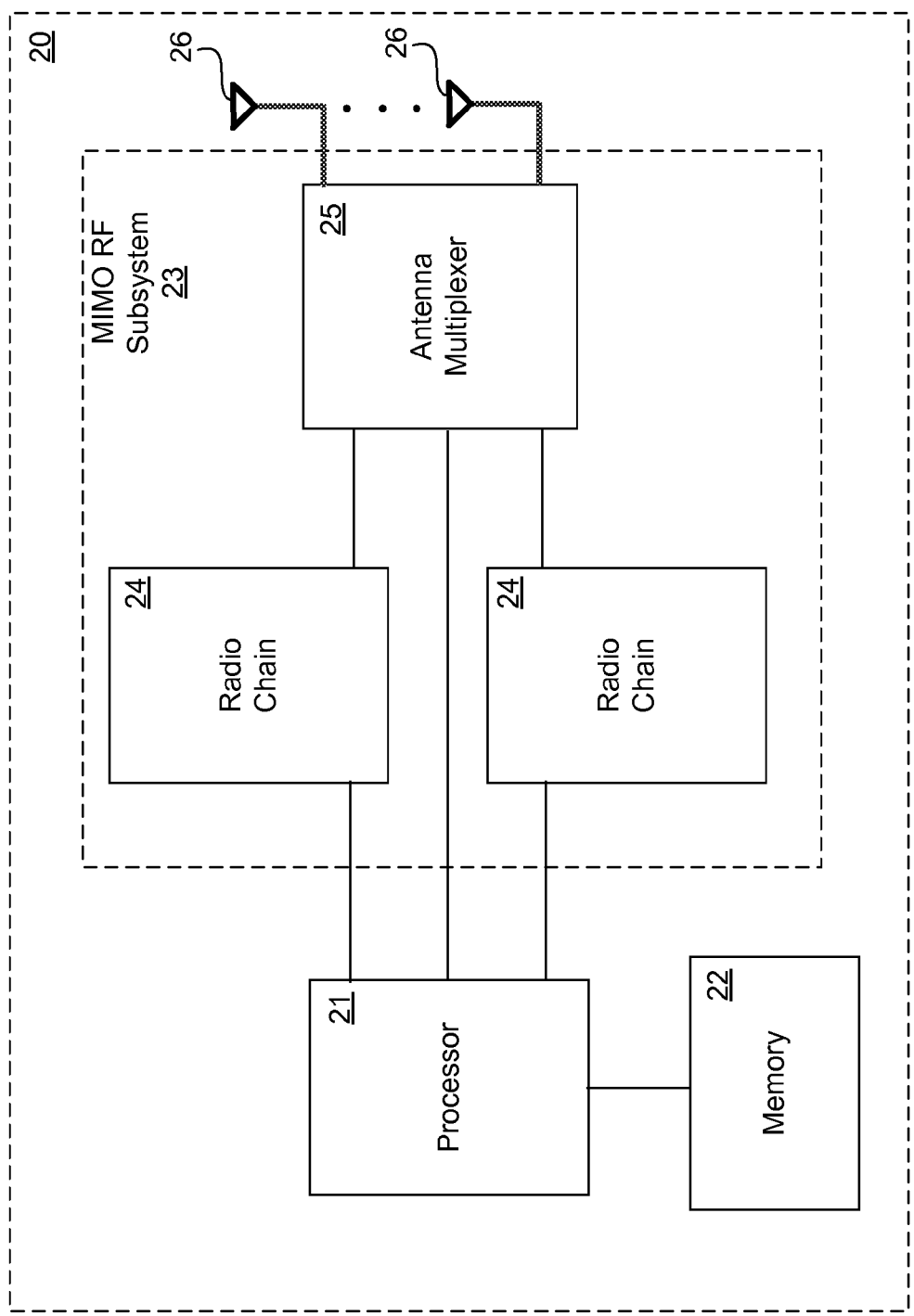
FIG. 2 illustrates a simplified block diagram of a station that can operate on a wireless syndication network and that can implement at least some of the operations associated with channel scanning.

FIG. 2 illustrates a simplified block diagram of a station that can implement at least some of the operations associated with the channel scanning and selection technique introduced here. Station 20 can be a client or AP, such as a client 2, 3 or AP 4 in FIG. 1. As shown, the station 20 includes a processor 21, a memory 22 coupled to the processor 21, and a MIMO radio frequency (RF) subsystem 23 coupled to the processor 21. The RF subsystem 23 in the illustrated embodiment includes multiple radio chains 24. Each radio chain 24 includes a radio (transmitter and/or receiver) and all of the supporting components for that radio. The RF subsystem 23 in the illustrated embodiment also includes an antenna multiplexer 25, which allows multiple antennas 26 of the station 20 to be switchably connected to the various radio chains 24. Note that other components which are not germane to this disclosure may also be included in the station 20. For example, if the station 20 is an end-user device, such as a mobile phone, it may further include various input/output (I/O) devices, such as a display device, keypad, microphone, speaker, etc.

The processor 21 may be or include the central processing unit(s) (CPU(s)) of the station 20 and, thus, control the overall operation of the station 20. In certain embodiments, the processor 21 accomplishes this by executing software and/or firmware (code and data) stored in memory, such as memory 22. The processor 21 may be, or may include, one or more programmable general-purpose or special-purpose microprocessors, digital signal processors (DSPs), programmable controllers, application specific integrated circuits (ASICs), programmable logic devices (PLDs), and/or any other known or convenient form of information processing device, or a combination of such devices.

Memory 22 is or includes the main memory (working memory) of the station 20. Memory 22 represents any form of random access memory (RAM), read-only memory (ROM), flash memory, and/or any other known or convenient form of information storage device, or a combination of such devices. In use, memory 22 may contain, among other things, software and/or firmware code and data to cause operations such as described herein to be performed. This can include code for implementing some or all of the channel scanning technique introduced here.

The technique introduced here in one embodiment includes scanning a set of channels of a wireless communication network to determine a measure of quality of each channel in the set during an operational mode/process of the wireless network (i.e., when data communication is enabled), after completing a start-up mode/process. Channel quality for any given channel can be a function of any of various factors, such as number and strength of overlapping BSSs, the presence or absence of radar, number and strength of interferers, transmit power allowed on the channel, position of the channel relative to other channels in the frequency band, number and strength of BSSs on adjacent channels in the frequency band, etc. The channel quality is then used to rank the channels. The quality measure and ranking can then be used to determine whether the current channel being used for data communication is the best channel. If it is not, a better channel can be selected and data communication can be switched to the better channel.

The ability to do channel scanning and selection during operational mode is significant, because performing channel scanning while data communication is occurring (or at least enabled to occur) is problematic. In certain embodiments, this difficulty is overcome by performing channel scanning during data communication idle time. In other embodiments, it is performed by taking advantage of dual concurrent capability of the system to perform channel scanning simultaneously with data communication. "Dual concurrent" capability is the ability of a system or device to communicate simultaneously in two different frequency bands, such as 2.4 GHz and 5 GHz. Of course, the technique introduced here can also (or alternatively) be used to perform channel scanning during start-up mode.

Figure 3:
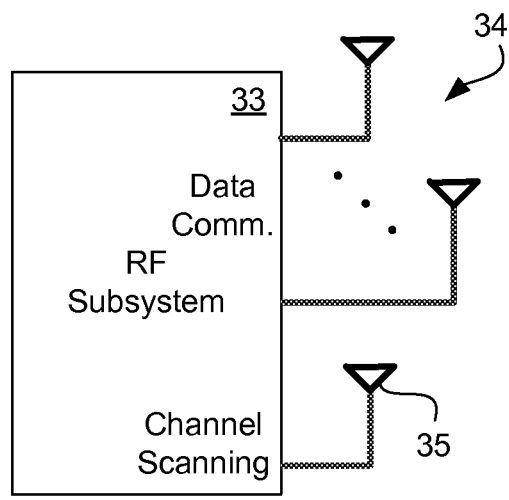
FIG. 3 illustrates an example of a configuration of antennas and RF subsystem, including a predetermined dedicated antenna for channel scanning.
Figure 4:
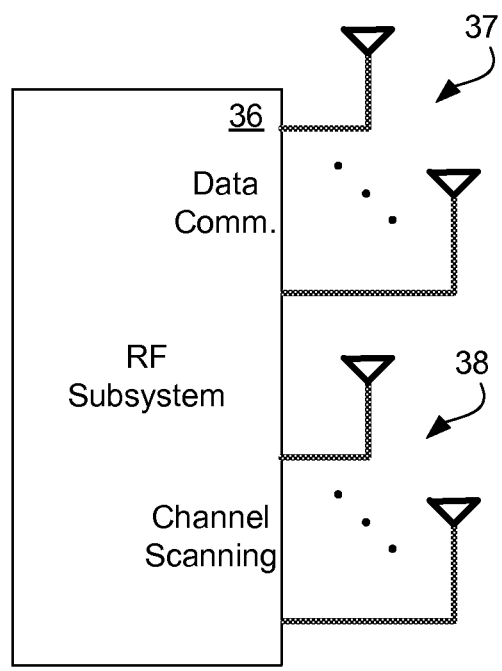
FIG. 4 illustrates an example of a configuration of antennas and RF subsystem, including multiple antennas dedicated for channel scanning, and multiple antennas dedicated for data communication.

FIG. 3 illustrates an example configuration of antennas and RF subsystem 33 for a station that can operate on a wireless communication network according to the technique introduced here. As shown, a station may include multiple antennas 34, 35, where one of those antennas 35 is dedicated to perform channel scanning only, whereas other antennas 34 are dedicated for performing data communication. "Data communication", as the term is used herein, means communication of information other than control information. FIG. 4 illustrates another embodiment, which includes multiple antennas 37 coupled to the RF subsystem 36 and dedicated for channel scanning, and another set of multiple antennas 38 dedicated for data communication.

Figure 5:
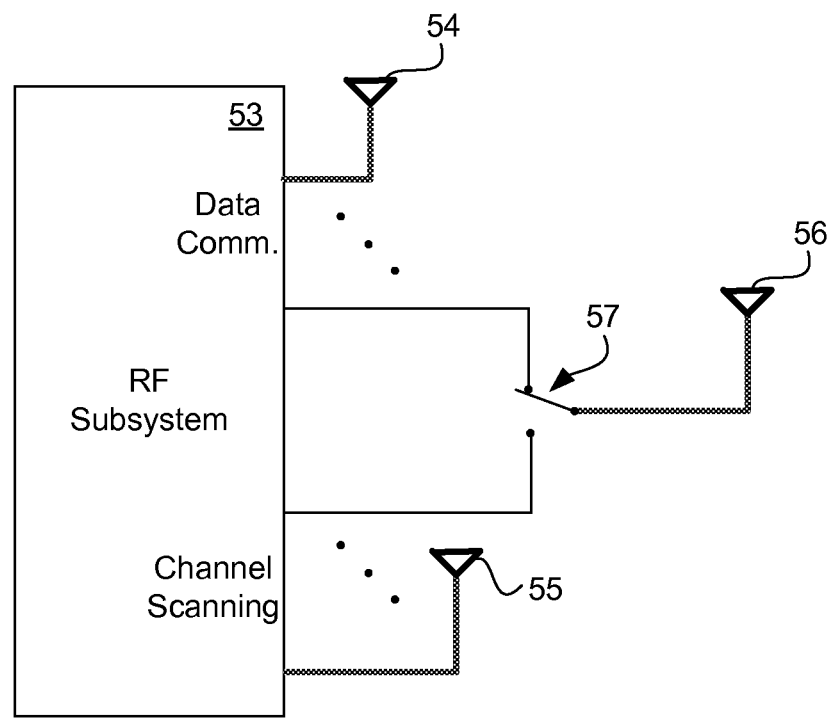
FIG. 5 illustrates an example of a configuration of antennas and RF subsystem, including one or more antennas that are switchable for use in either data communication or channel scanning.

FIG. 5 illustrates yet another embodiment, in which at least one antenna 54 coupled to the RF subsystem 53 is dedicated for data communication, at least one other antenna 55 is dedicated for channel scanning, and one or more additional antennas 56 are switchable for use in either data communication or channel scanning at any given time. This ability may be provided by one or more switches 57, which may be included in an antenna multiplexer (not shown in FIG. 5). The number of antennas used for channel scanning or data communication, and which particular antennas are used for such purpose, can be selected dynamically during operation of the system, to optimize one or more specific performance characteristics. For example, during times of relatively light data traffic involving the station, the switchable antenna(s) 56 may be switched for use in channel scanning, whereas in times of relatively heavy data traffic the switchable antenna(s) may be switched for use in data communication.

As noted above, channel scanning may be performed during idle time on the wireless indication network. In that case, for example, the channel scanning can be done intermittently. For example, after communicating data on first channel for some time, the station switches from the first channel to a second channel without terminating the communication link, then scans the second channel for some time (e.g., 0.9 seconds), and then switches back to the first channel before the communication link is terminated, for a short time (e.g., 0.1 seconds) to maintain the link, before doing additional scanning.

In some embodiments, channel scanning is performed by taking advantage of dual concurrent capability of the system to perform channel scanning simultaneously with data communication. For example, a 2N×2N dual concurrent mode system can use N×N mode (i.e., can use N transmitters, receivers and antennas, where N is an integer) to maintain a data communication link while using another N×N mode (i.e., using a different N transmitters, receivers and antennas) to scan other channels. In such an embodiment, channel scanning does not have to wait for traffic idle times. Dual N×N mode can also be used to communicate data on one channel while monitoring for radars on another dynamic frequency selection (DFS) channel. This avoids any interruption in data communication that would otherwise result from having to perform the standard 60-second channel availability check before initiating data communication on a new channel (i.e., in a system where only a single channel can be used at a time). That is, the channel availability check can be initiated and completed on the second DFS channel while data communication is still occurring on the first channel, to allow essentially seamless transition of data communication from the first channel to the second DFS channel.

Figure 6:
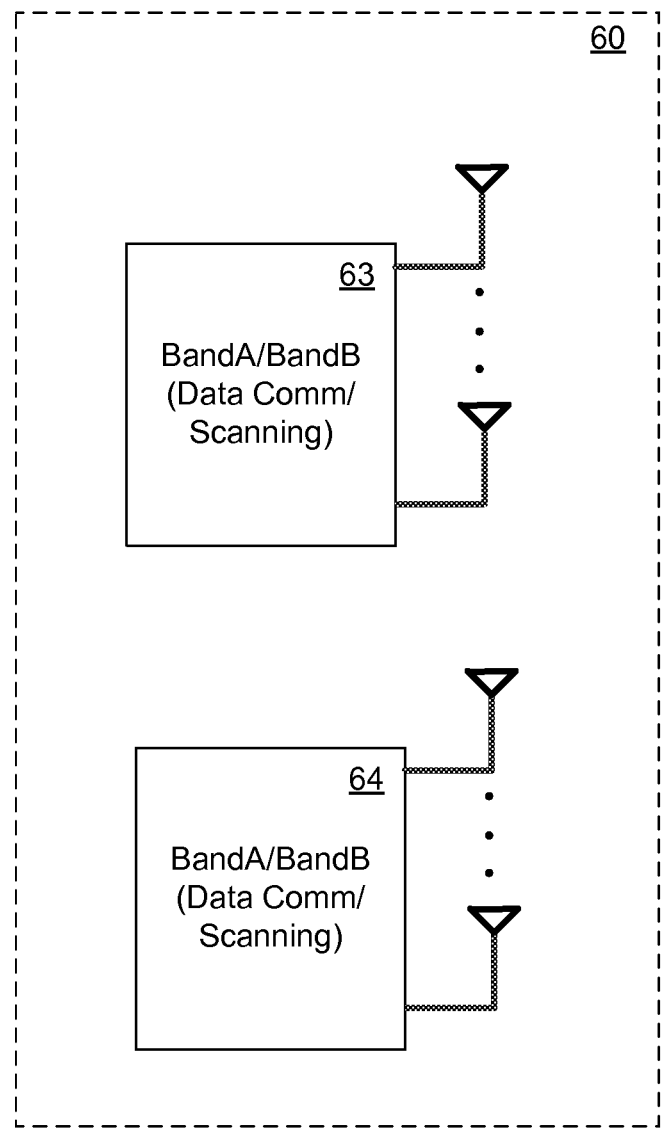
FIG. 6 illustrates portions of a dual concurrent mode station in which the channel scanning technique takes advantage of the dual concurrent ability of a station.

FIG. 6 illustrates an embodiment in which the channel scanning technique takes advantage of dual concurrent ability of a station. The station 60 includes at least two RF subsystems 63, 64, each of which can operate in any one of multiple frequency bands (e.g., 2.4 GHz and 5 GHz) at any given time. As such, the station 60 can operate in multiple frequency bands simultaneously. In this embodiment, each of the RF subsystems 63, 64 also is configured (or configurable) to operate in either a data communication mode or a channel scanning mode (e.g., as determined by the processor, not shown in FIG. 6). In that case, one of the RF subsystems 63 can perform channel scanning simultaneously with the other one of the RF subsystems 64 performing data communication, or vice versa.

Figure 11:
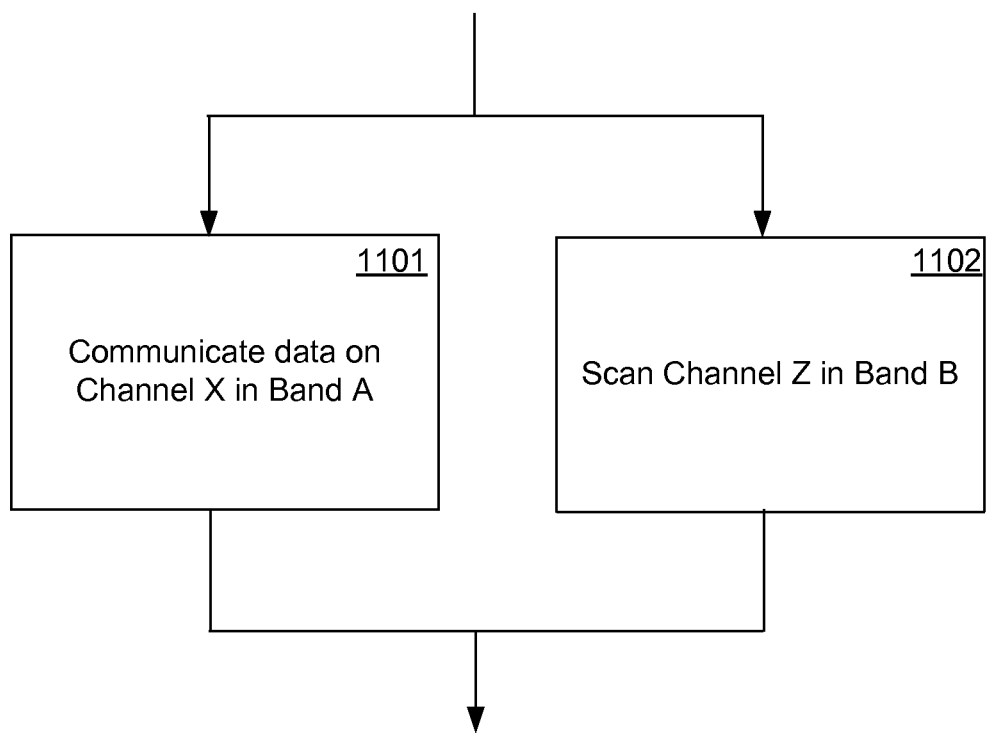
FIG. 11 illustrates a process in which channel scanning is done simultaneously with data communication.

FIG. 11 illustrates a process by which this can occur in a given station, or between two or more stations, on a wireless indication network. As shown, channel scanning (1102) on a given channel, channel Z, in a first frequency band, band B, occurs simultaneously with data communication (1101) on another channel, channel X, in a separate band, band A (these channel and band identifiers are arbitrary and are used here only for purposes of explanation). In another embodiment, channel scanning occurs simultaneously with data communication on a different channel in the same frequency band.

The technique introduced here can also be implemented in an M×N MIMO, where M and N are integers that are not necessarily equal. For example, an M×N MIMO system can use M1×N1 mode (i.e., M1 transmitters and antennas and N1 receivers and antennas) for channel scanning and use M2×N2 mode (i.e., M2 transmitters and antennas and N2 receivers and antennas) for data communication, where M=M1+M2 and N=N1+N2. The number of antennas used for channel scanning or data communication, and which particular antennas are used for such purposes, can be selected dynamically during operation of the system, to optimize one or more specific performance characteristics.

In a network of APs and client stations, at any given time each AP is communicating with a single client station. Therefore, other client stations are available and may scan the available channels and return the results to the AP, for developing a lookup table of the best channels available. The AP may then use these results to select the best channel for data communication.

In certain embodiments, therefore, the operations that implement the channel scanning technique may be distributed among two or more stations on a network, such as an AP and one or more client stations. An AP may command one or more other stations on its wireless communication network to perform channel scanning and send the results back to the AP. Hence, channel scanning can be performed by any station, which may be in response to a command it receives from another station on the network, such as an AP. In that case, the station that does the scanning may send a result of the channel scanning to another station on the network, which may be but is not necessarily the station which sent the command.

The AP may advertise the results of scanning multiple channels, including a quality ranking of channels, to other devices on the network. For example, referring to FIG. 7, an AP may maintain a lookup table 71 or other type of data structure that lists the channels in the applicable frequency band and an associated quality measure and/or quality rank for each channel, where the rank is based on the channel's most recent quality measure. The contents of this data structure may then be transmitted to other stations on the network, via beacon messages, for example. Similarly, in an ad hoc network (i.e., a network made of only an independent based service set (IBSS), as defined in the IEEE 802.11 specification), non-communicating (idle) stations can scan channels for purposes of constructing a channel quality look up table or other similar data structure.

Figure 8:
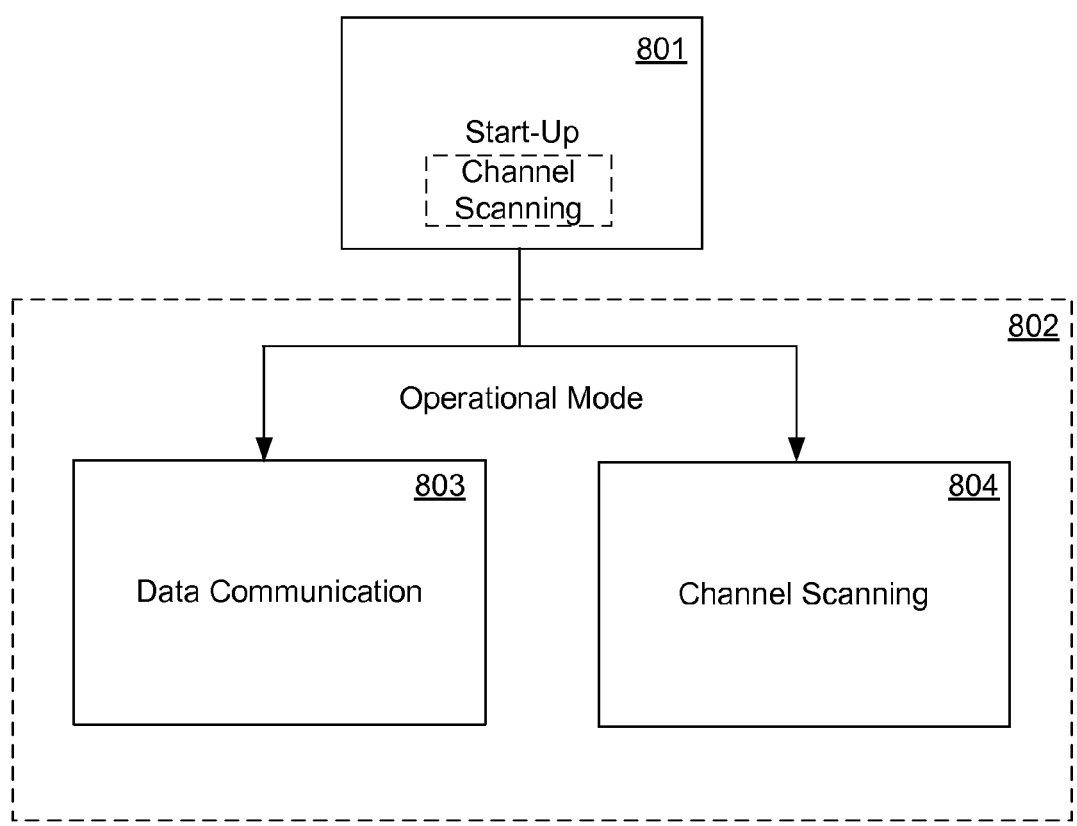
FIG. 8 illustrates an example of an overall process that may be performed in a wireless communication system or device according to the technique introduced here.

FIG. 8 illustrates an example of an overall process that may be performed in a wireless communication system or device according to the technique introduced here. Initially, one or more stations on a wireless network engage in a startup (initialization) mode or process 801, the purpose of which is to get the system or device into a normal operational mode or process 802 (i.e., a state in which data communication between devices on the network is enabled). The details of the startup mode or process 801 are not germane to the technique being introduced here. In the illustrated embodiment, the operational mode or process 802 includes both data communication (803) between stations and channel scanning (804) according to the technique introduced here. Note that in some embodiments, channel scanning 804 as described herein may alternatively (or additionally) be implemented in the startup mode or process 801.

Figure 9:
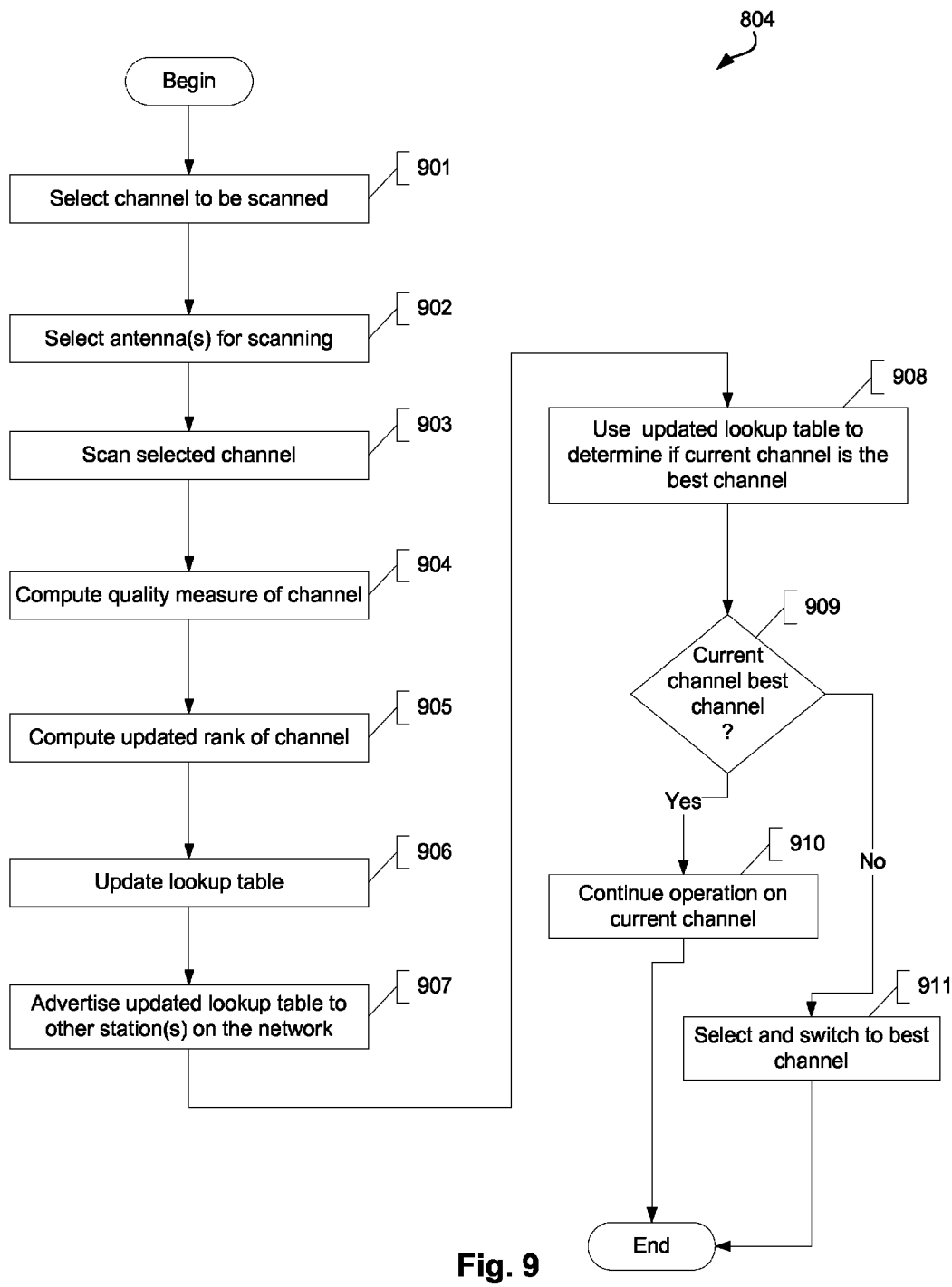
FIG. 9 illustrates an example of the channel scanning process according to the technique introduced here.

FIG. 9 illustrates an example of the channel scanning process 804. The channel scanning process 804 can be performed in a single device, such as a station, or it can be distributed across multiple devices, on a wireless communication network. Initially, at step 901 the process selects a channel to be scanned. Next, optionally, at step 902 the process selects one or more antennas to be used for the channel scanning. For example, antenna selection may be performed in a system which allows dynamic selection of the number of antennas (or which particular antennas) that should used for channel scanning. Step 902 may be omitted if, for example, the antenna or antennas to be used for channel scanning in the system or device are predetermined and fixed.

Next, at step 903 the process scans the selected channel to measure one or more parameters that can affect channel quality, such as the number and strength of overlapping BSSs, the presence or absence of radar, interference level, etc. The specific manner in which these measurements are made is not germane to the technique introduced here. The process then computes a quality measure for the channel at step 904 based on these one or more parameters. The specific manner in which the quality measures computed also is not germane to the technique introduced here. However, it may be based on, for example, a formula in which two or more of these parameters are weighted and combined to produce a single quality value. At step 905 the process computes a rank of the scanned channel relative to the other accessible channels in the relevant frequency band. At step 906 the process updates a lookup table (or other suitable data structure) in at least one station on the network, based on the results of steps 904 and/or 905. That is, each entry in the lookup table may include the channel's quality measure, quality rank, or both, in association with an identifier of the channel, as illustrated in FIG. 7. Optionally, at step 907 the lookup table is advertised to one or more other stations on the network. Then, optionally, this information is used to determine if the current operational channel is the best channel (i.e., based on the channel's quality measure and/or rank) (steps 908 and 909). If it is, then operation continues on the current channel (step 910). If it is not, then a new channel is selected (the best channel, based on the channels' quality measures and/or ranks) and data communication is switched to that channel (step 911).

Figure 10:
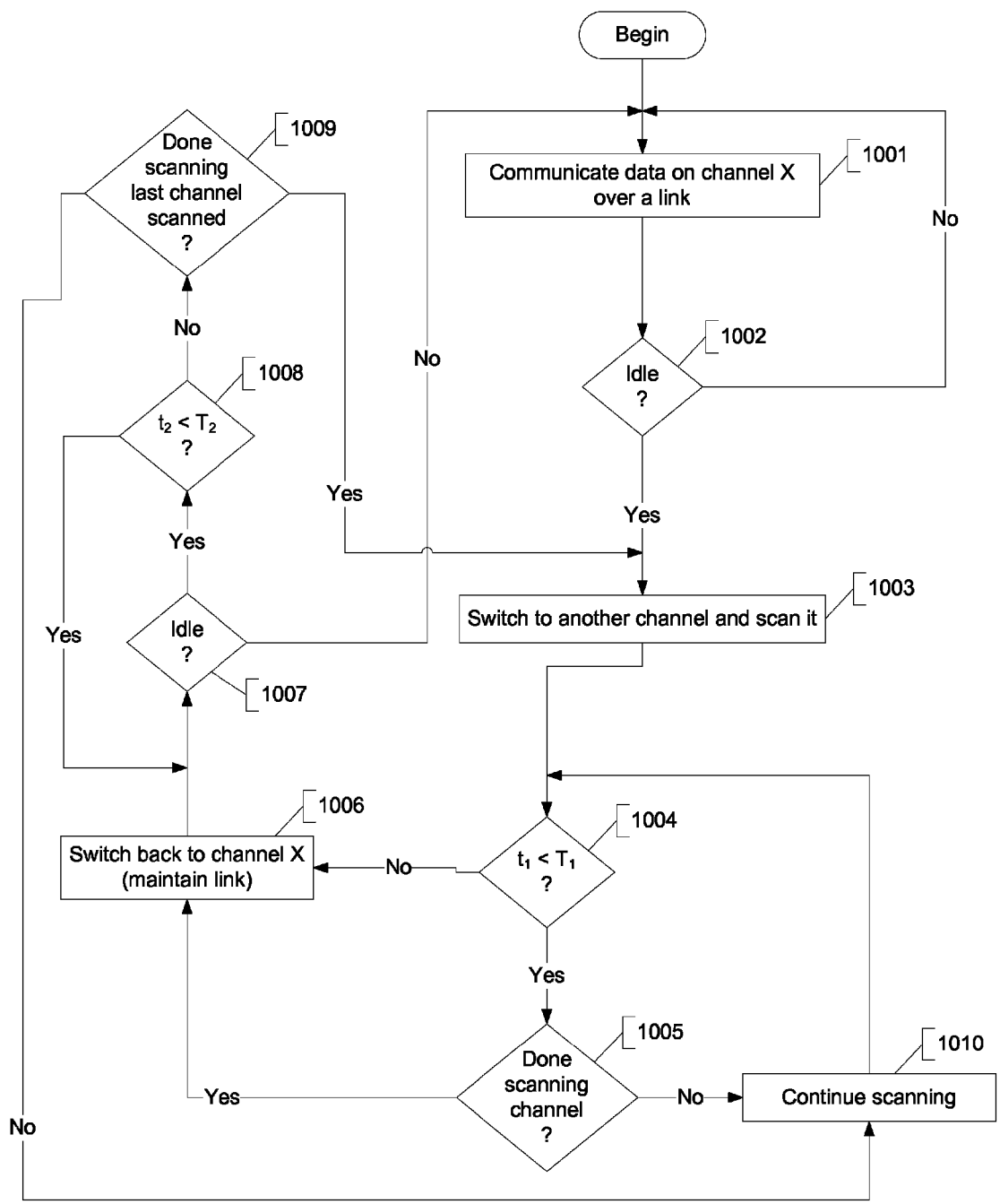
FIG. 10 illustrates a process by which idle time channel scanning can be done in a station on a wireless communication network.

As described above, channel scanning can be performed during data communication idle time. FIG. 10 illustrates a process by which that can be done in a station on a wireless communication network. Initially, the station communicates data on a particular channel, channel X, over a wireless link, at step 1001. When the station detects that channel X is idle (i.e., there is no data communication occurring on channel X)(step 1002), the station switches to another (second) channel and scans it at step 1003, in the manner described above.

In the embodiment of FIG. 10 the process uses a timer variable $t_1$ and corresponding timeout value $T_1$ to determine the amount of time that it can spend scanning the second channel before the station must switch back to channel X. The value $T_1$ is chosen to be just small enough to cause the station to switch back to channel X before the link can be dropped (e.g., due to the station failing to acknowledge a communication from another station on channel X). As long as the timer variable $t_1$ has not reached the timeout value $T_1$ and the station has not finished scanning the second channel, the station continues to scan the second channel (step 1010). When the station has finished scanning the second channel or the timer $t_1$ reaches the timeout value $T_1$ (whichever happens first), the process proceeds to step 1006, where the station switches back to the first channel, channel X, in order to maintain the link.

After the station switches back to channel X, it will remain there only as long as necessary to avoid dropping the link (e.g., long enough to acknowledge a communication from another station on channel X) as long as channel X remains idle (i.e., as long as there is no data communication on channel X). Therefore, the process of FIG. 10 also employs a second timer variable $t_2$ and corresponding timeout value $T_2$, to determine how long the station must remain back on channel X in the absence of data communication on that channel, before resuming channel scanning. Typically, $T_2$ will be a much shorter period of time than $T_1$. For example, $T_1$ might be 0.9 seconds while $T_2$ may be 0.1 seconds.

If data communication is required on channel X, the process then loops back to step 1001, as described above. If the second timer $t_2$ reaches $T_2$ (step 1008) while channel X is still idle (step 1007), then the process then loops back to step 1005 if it had not finished scanning the last channel that was scanned (step 1009), or to step 1003 if it had finished scanning the last channel. The process can repeat in this manner continuously, such that it continues to update the measures of channel quality and ranks for all channels to determine the current best channel at any given time.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (e.g., a station on a wireless communication network or any other computer or computing/communication device). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   selecting a channel to be scanned, of a wireless communication network;
   scanning the channel of the wireless communication network to determine a measure of quality of the channel while maintaining an operational mode of the wireless network after a start-up mode, wherein the operational mode is characterized by two or more devices on the wireless communication network being able to communicate data with each other over the wireless communication network; and
   in a first station on the wireless communication network, maintaining a data structure that includes identifiers of a plurality of channels of the wireless communication network and a corresponding measure of quality for each of the plurality of channels;
   using a result of said scanning to create or update the data structure; and
   advertising contents of the data structure from the first station to a second station on the wireless communication network.

2. A method comprising:
   selecting a channel to be scanned, of a wireless communication network; and
   scanning the channel of the wireless communication network to determine a measure of quality of the channel while maintaining an operational mode of the wireless network after a start-up mode, wherein the operational mode is characterized by two or more devices on the wireless communication network being able to communicate data with each other over the wireless communication network;
   wherein said scanning is done in an M×N multiple-input multiple-output (MIMO) system which uses M antennas for transmission and N antennas for reception, where M and N each are integers greater than or equal to two (2), and wherein said scanning is done by using N1 antennas for scanning, wherein N1 is an integer greater than or equal to one (I) and less than or equal to N.

3. A method as recited in claim 2, wherein said scanning is performed via the N1 antennas and data communication is performed via other antennas of the MIMO system other than the N1 antennas.

4. A method as recited in claim 2, wherein said scanning is done using a first mode of the MIMO system simultaneously with data communication being done using a second mode of the MIMO system.

5. A method comprising:
   selecting a channel to be scanned of a wireless communication network; and
   scanning the channel of the wireless communication network to determine a measure of quality of the channel while maintaining an operational mode of the wireless network after a start-up mode, wherein the operational mode is characterized by two or more devices on the wireless communication network being able to communicate data with each other over the wireless communication network;
   wherein scanning the channel comprises, in a device, monitoring a first channel on the wireless communication network for radar while the device communicates data on a second channel on the wireless communication network; the method further comprising, after monitoring the first channel for a predetermined period of time without detecting radar, switching the device from the second channel to the first channel to communicate data on the first channel.

6. A method comprising:
   selecting a channel of a wireless communication network for scanning, by using an M×N multiple-input multiple-output (MIMO) wireless communication system on the wireless communication network, which uses M antennas for transmission and N antennas for reception, where M and N each are integers greater than or equal to two (2);
   in the M×N MIMO wireless communication system, scanning the channel to determine a characteristic of the channel during an operational mode of the wireless network after a start-up mode, wherein the operational mode is characterized by two or more devices on the wireless communication network being able to communicate data with each other over the wireless communication network, wherein said scanning includes using N1 antennas for scanning, where N1 is an integer greater than or equal to one (1) but less than or equal to N, and wherein data communication is performed via antennas of the MIMO system other than the N1 antennas; and
   computing a quality value for the channel based on the characteristic, during the operational mode.

7. A method as recited in claim 6, wherein the wireless communication network is an IEEE standard 802.11 compliant network.

8. A method as recited in claim 6, wherein said scanning is done using a first mode of the MIMO system simultaneously with data communication being done using a second mode of the MIMO system.

9. A method as recited in claim 6, further comprising: dynamically selecting the N1 antennas to be used for scanning, during operation of the MIMO system.

10. A method as recited in claim 6, wherein said scanning is performed during data communication idle time on the wireless communication network.

11. A method as recited in claim 6, wherein said scanning comprises: after communicating data on a first channel via a communication link, switching to a second channel without terminating the communication link; scanning the second channel; and after scanning the second channel, switching back to the first channel before the communication link is terminated.

12. A method as recited in claim 6, wherein said scanning is performed simultaneously with data communication on the wireless communication network.

13. A method as recited in claim 6, wherein said scanning is performed by a second station on the wireless communication network in response to a command from a first station on the wireless communication network.

14. A method as recited in claim 13, further comprising: sending a result of said scanning from the second station to another station on the wireless network.

15. A method as recited in claim 6, wherein said scanning is performed by an access point on the wireless communication network, and wherein the access point selects a channel, to use for data communication based on a result of said scanning.

16. A method as recited in claim 6, wherein said scanning is performed by a mobile station on the wireless communication network.

17. A method as recited in claim 16, wherein said scanning is performed by the mobile station in response to a command from an access point on the wireless communication network.

18. A method as recited in claim 16, further comprising sending a result of said scanning from the mobile station to an access point on the wireless communication network.

19. A method as recited in claim 18, wherein the access point selects a channel to use for data communication, based on the result.

20. A method as recited in claim 6, further comprising: in a first station on the wireless communication network, maintaining a data structure that includes identifiers of a plurality of channels of the wireless communication network and a corresponding measure of quality for each of the plurality of channels; using a result of said scanning, to create or update the data structure; and advertising contents of the data structure from the first station to a second station on the wireless communication network.

21. A method as recited in claim 6, further comprising: in a first station on the wireless communication network, identifying a second station that is not presently communicating data on the wireless communication network; and sending a command from the first wireless station to the second wireless station to cause the second wireless station to perform said scanning.

22. A method as recited in claim 21, further comprising: receiving a result of said scanning at the first wireless station from the second wireless station.

23. A method as recited in claim 6, wherein scanning the channel comprises, in a device, monitoring a first channel on the wireless communication network for radar while the device communicates data on a second channel on the wireless communication network the method further comprising, after monitoring the first channel for a predetermined period of time without detecting radar, switching the device from the second channel to the first channel to communicate data on the first channel.

24. A station for communicating data on a wireless communication network, the station comprising:
   a plurality of antennas;
   a. multiple-input multiple-output (MIMO) radio subsystem coupled to the plurality of antennas; and
   a processor coupled to the MIMO radio subsystem, the processor configured to cause the station to scan a channel of the wireless communication network to determine a measure of quality of the channel during an operational mode after a start-up mode, wherein the operational mode is characterized by two or more devices on the wireless communication network being able to communicate data with each other over the wireless communication network;
   wherein the processor is configured to cause the station to monitor a first channel on the wireless communication network for radar while the station communicates data on a second channel on the wireless communication network, and to switch from the second channel to the first channel to communicate data on the first channel after monitoring the first channel for a predetermined period of time without detecting radar.

* * * * *